Figure 1:
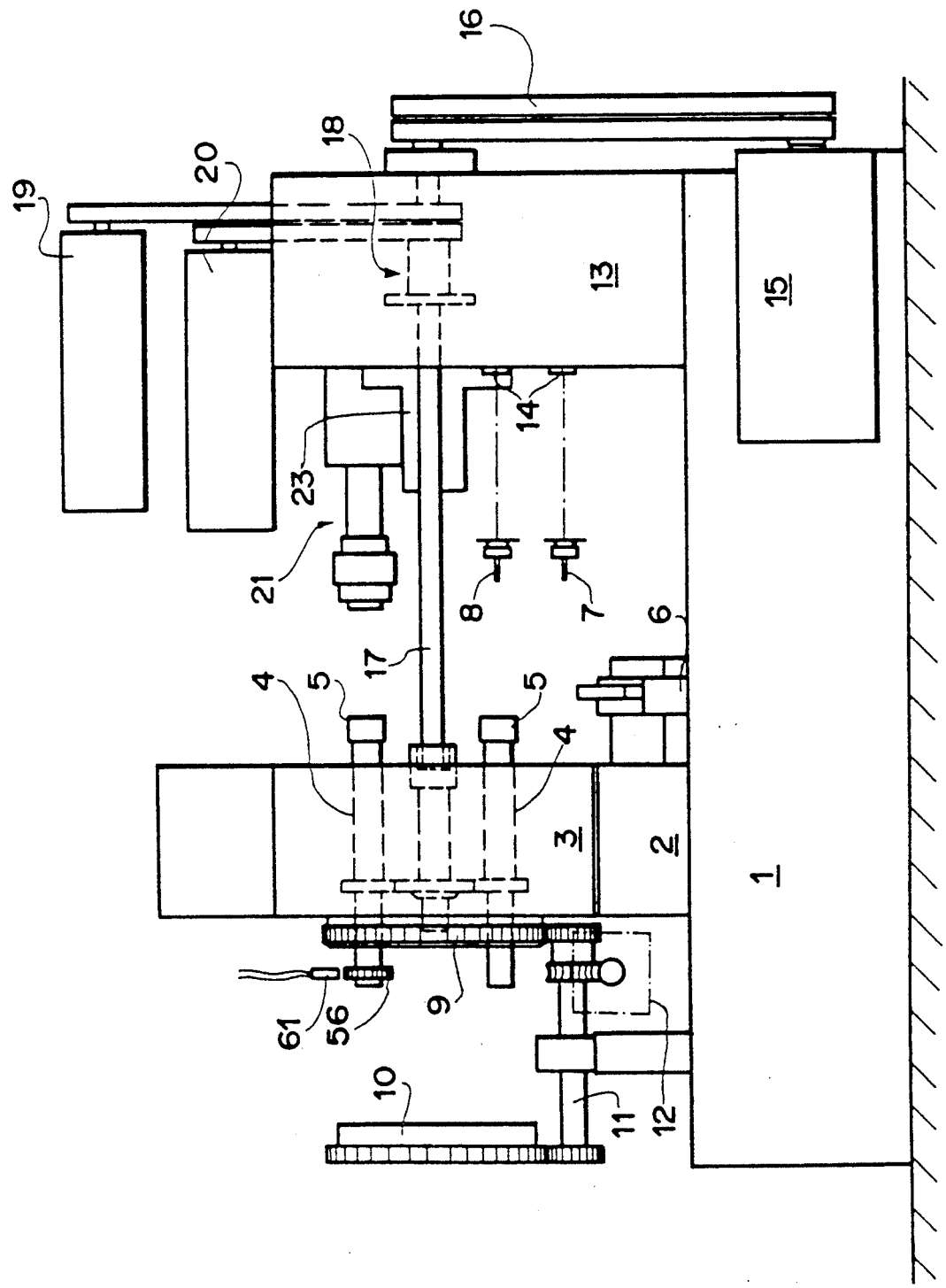

United States Patent [19]

Simonin

[11] Patent Number: 5,042,126
[45] Date of Patent: Aug. 27, 1991

[54] DRIVE APPARATUS FOR MULTI-SPINDLE PROCESSING MACHINES

[75] Inventor: Jean C. Simonin, Moutier, Switzerland

[73] Assignee: Tornos-Bechler SA, Fabrique de Machines Moutier, Switzerland

[21] Appl. No.: 392,594

[22] Filed: Aug. 11, 1989

[30] Foreign Application Priority Data

Aug. 16, 1988 [CH] Switzerland .................... 3066/88

[51] Int. Cl.$^5$ ............................................ B23P 23/00
[52] U.S. Cl. ...................................... 29/38 B; 29/563
[58] Field of Search ................. 29/564, 38 B, 38 A, 29/38 R, 37 R, 563, 27 C; 82/124, 126, 127, 129; 279/41 A, 5, 46 A

[56] References Cited

U.S. PATENT DOCUMENTS

| | | | |
|---|---|---|---|
| 1,582,484 | 4/1926 | Ryder | 29/38 A |
| 2,190,208 | 2/1940 | Green | 29/38 B |
| 2,392,999 | 2/1944 | Redmer . | |
| 2,606,359 | 8/1952 | Stadthaus | 29/38 B |
| 3,683,724 | 8/1972 | Crane | 29/38 B |
| 4,185,366 | 1/1980 | Gilbert | 29/37 R X |
| 4,351,096 | 9/1982 | Depweg et al. | 29/38 A |
| 4,557,166 | 12/1985 | Jauch . | |

FOREIGN PATENT DOCUMENTS

| | | | |
|---|---|---|---|
| 3204886 | 2/1982 | Fed. Rep. of Germany . | |
| 265247 | 11/1986 | Japan | 29/564 |
| 860927 | 6/1959 | United Kingdom . | |
| 1372690 | 11/1974 | United Kingdom | 29/38 R |

Primary Examiner—Larry I. Schwartz
Assistant Examiner—Robert Schultz
Attorney, Agent, or Firm—Oliff & Berridge

[57] ABSTRACT

On a processing machine having a tool-holding frame (13) facing a mutli-spindle barrel (3), one of the work stations is equipped with a support (23) bearing a spindle (38) capable of being driven axially (22) and rotatingly (C). During the cycle of operations, an auxiliary chuck mounted in a body (39) can move to grasp the end of a bar or a workpiece (57) and guide it into the field of a milling cutter (60). An AZ2C-axis control makes it possible, for example, to machine a helical groove in the cylindrical flank of the workpiece.

9 Claims, 6 Drawing Sheets

DRIVE APPARATUS FOR MULTI-SPINDLE PROCESSING MACHINES

This invention relates to machining equipment, and more particularly to driving and control apparatus intended for a multi-spindle processing machine, of the type having actuating means, a barrel indexable about an axis, a series of spindles distributed about the axis, on the barrel, a frame and, in front of the barrel, work stations, at least some of which form a front-mounted assembly, equipped with rotary driving means.

Until now, when an indexing operation has had to be carried out between two machining operations on a bar or workpiece borne by a spindle situated in a predetermined machining station, there has been provided on the barrel support a device including an auxiliary motor capable of engaging the spindle to be indexed at the moment when such indexing is to be carried out, and means have likewise been provided for uncoupling the spindle from its usual drive shaft, stopping it, and putting it in free-wheeling so that the auxiliary motor can rotate it through the desired angle.

Certain multi-spindle processing machines are already equipped with auxiliary apparatus comprising a chuck capable of gripping a workpiece in a machining spindle in order to transfer it to another spindle during a cycle. Thus, West German Patent No. 3,204,886 describes a processing machine having a multi-spindle indexable barrel and two front-mounted work-station assemblies disposed in front of and behind the barrel, respectively. The chuck of the auxiliary apparatus can grip a workpiece in a spindle of the barrel oriented toward one of the work-station assemblies in order to transfer it to a spindle oriented toward the other assembly. However, this chuck is not capable of supporting the workpiece when it is driven rotatingly.

On the other hand, pneumatically controlled chucks per se have already been proposed in the art of processing machines, particularly in U.S. Pat. No. 2,392,999 and U.K. Patent No. 860,927.

It is an object of this invention to provide improved driving and control apparatus which is more compact, simpler, and above all more flexible in operation.

A further object of the invention is to provide such apparatus which allows not only spindle indexing but also a number of other functions which increase the operating ability of the multi-spindle processing machines.

Still another object of this invention is to provide apparatus which remedies the drawbacks of the prior art cited above and thus answers the need for improvement and new development in multi-spindle processing machines.

To this end, the driving and control apparatus according to the present invention, of the type initially mentioned, comprises an autonomous unit having a chuck and operating components, and control means capable of being programmed, the unit being adapted to be mounted on a front-mounted work station and connected to its rotary driving means, and the control means being capable of actuating the operating components and the actuating means so that the machine carries out one or more operations, including at least one indexing operation, on a bar or a workpiece borne by one of the spindles which is situated in a machining station opposite the front-mounted work station.

Figure 2:
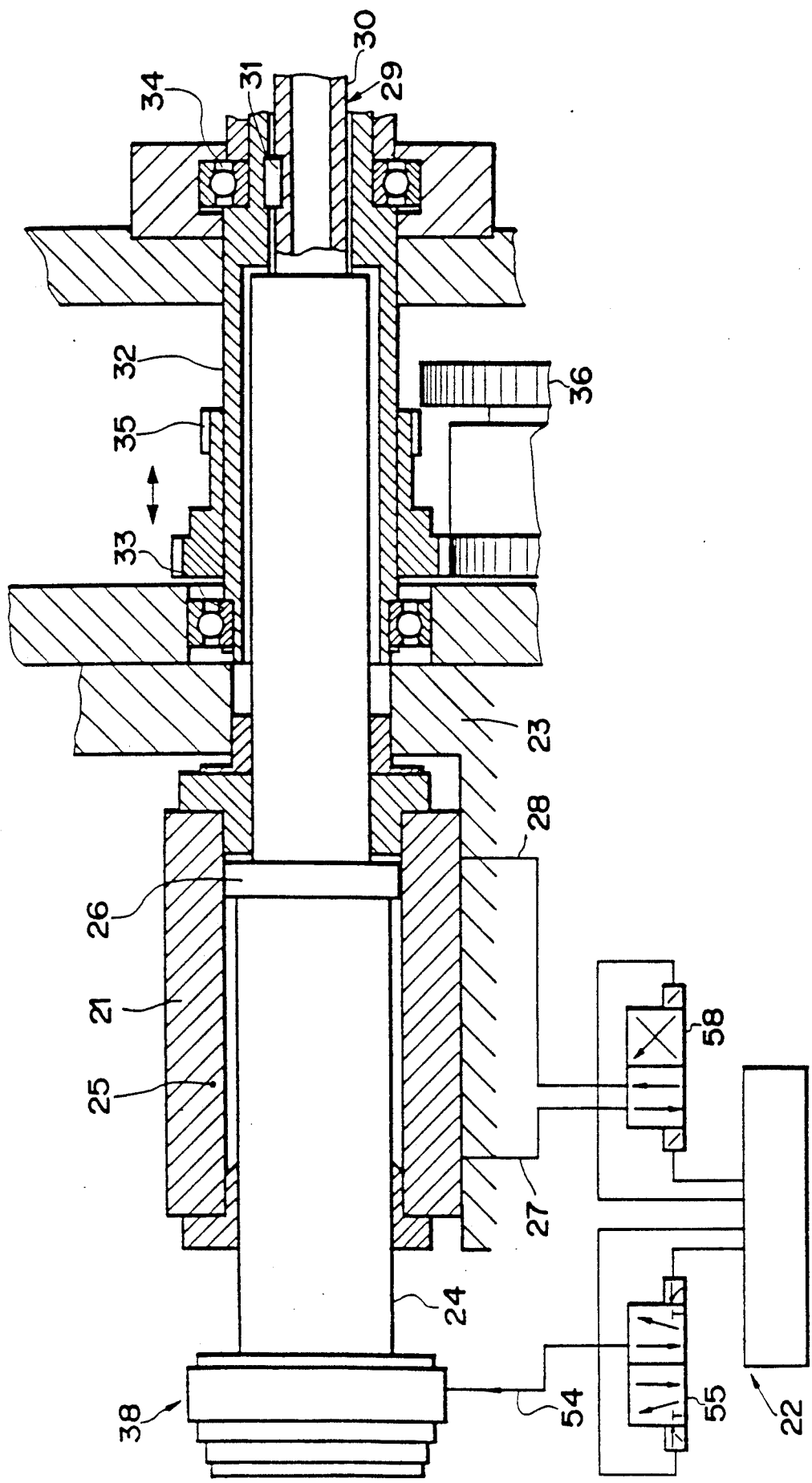
Figure 3:
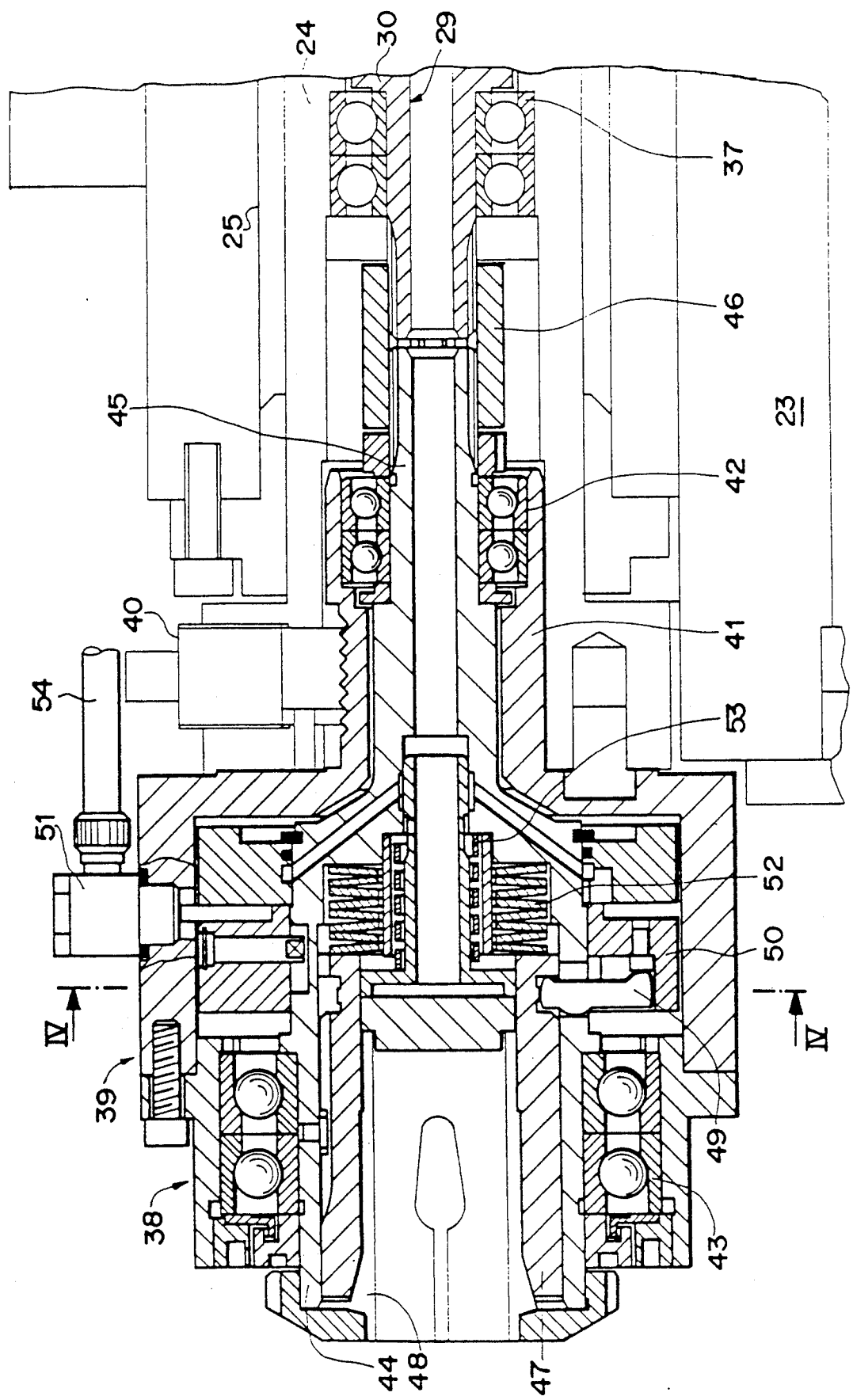
Figure 4:
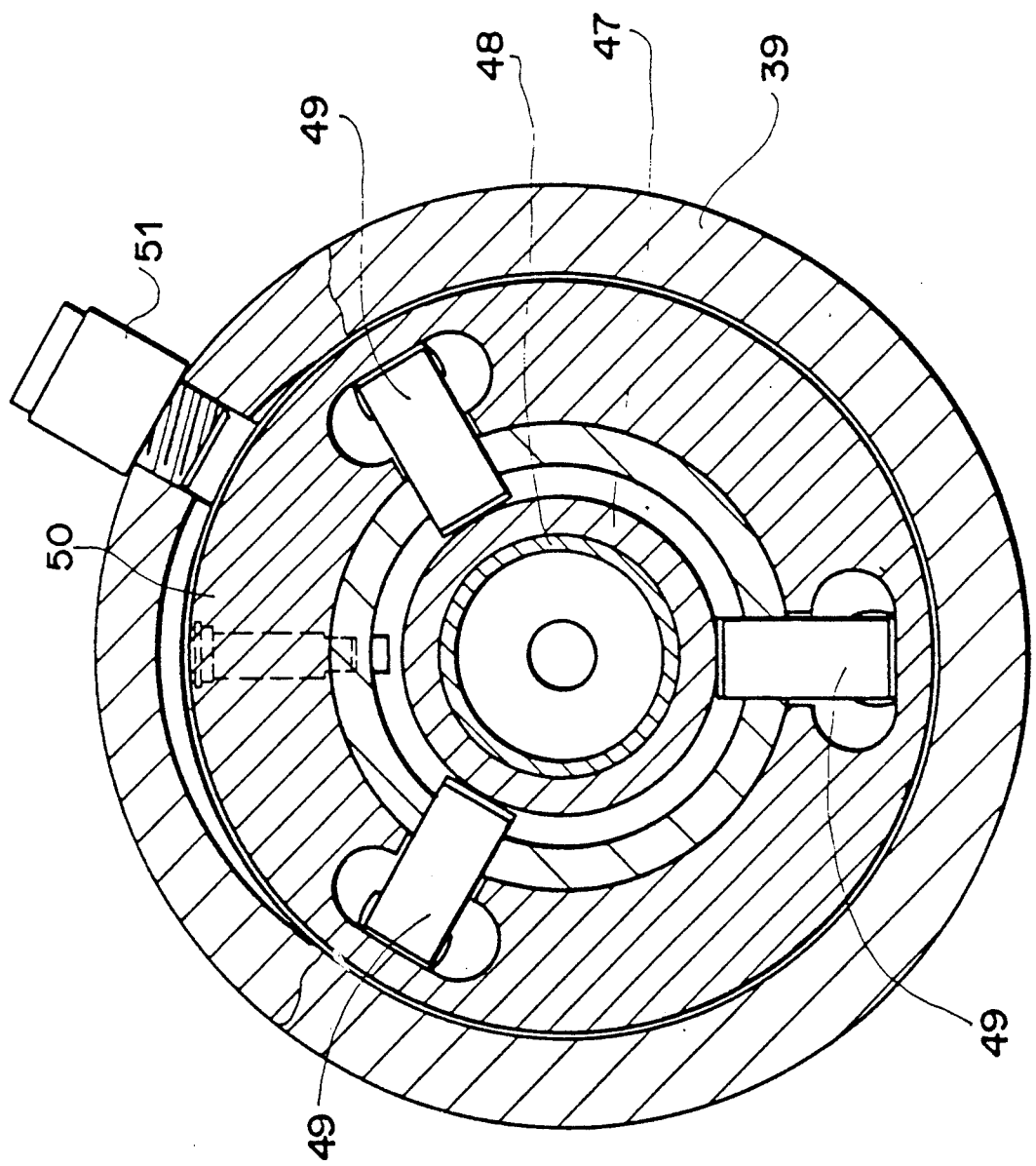
Figure 5:
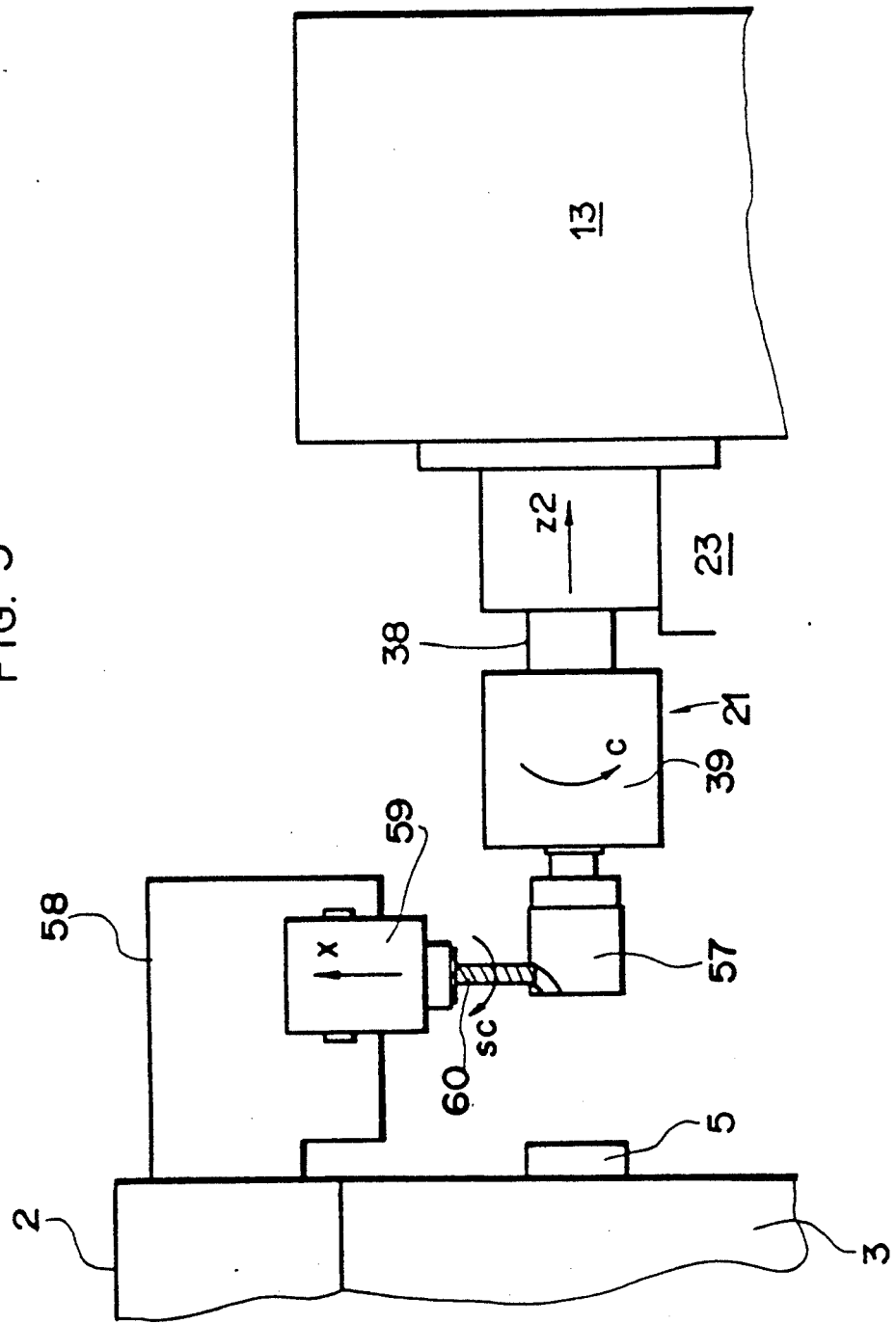
Figure 6:
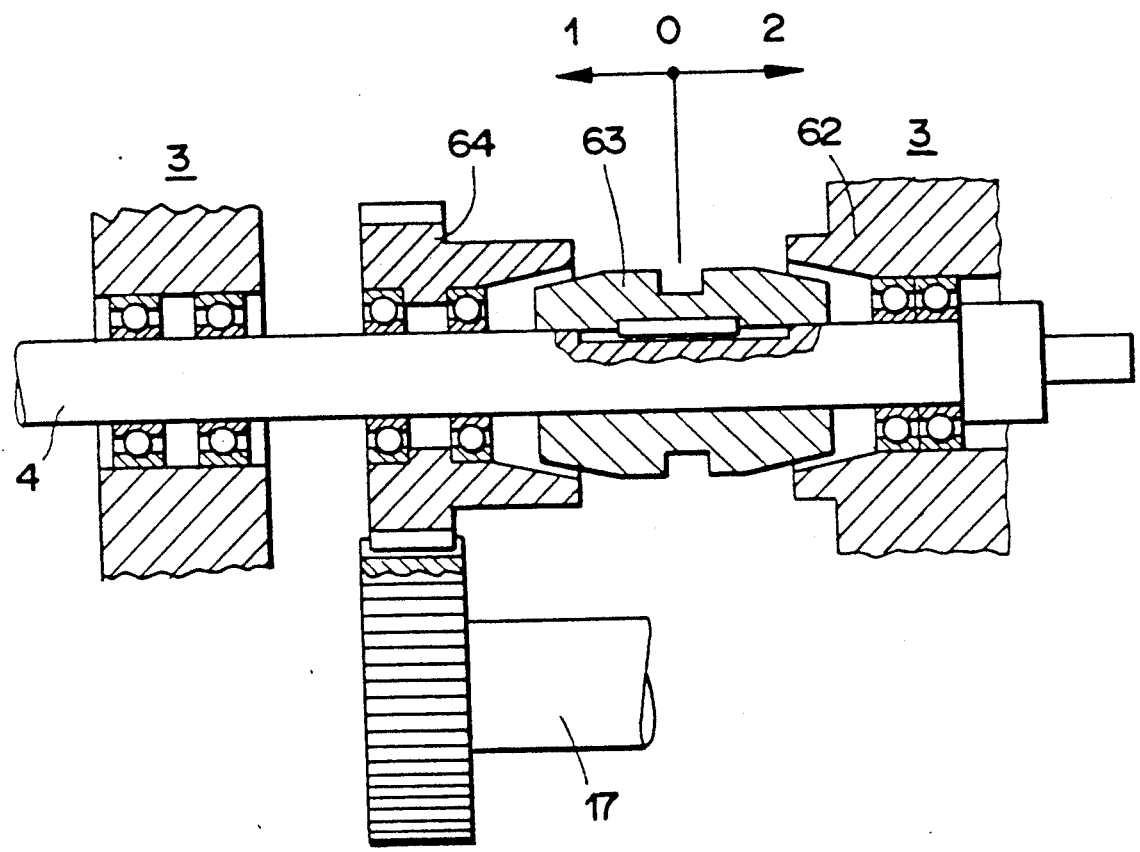

A preferred embodiment of the invention will now be described in detail with reference to the accompanying drawings, in which:

FIG. 1 is a diagrammatic elevation of a processing machine equipped with the inventive apparatus, FIG. 2 is a partial diagrammatic section through an autonomous unit forming part of the drive apparatus of the invention, FIG. 3 is a detailed axial section through a chuck forming part of the autonomous unit, FIG. 4 is a section taken on the line IV—IV of FIG. 3, FIG. 5 is a partial diagrammatic elevation illustrating C-axis working being carried out on a processing machine equipped with the inventive apparatus, and FIG. 6 is a partial diagrammatic elevation of a spindle-locking mechanism.

A brief description of the essential elements of the processing machine shown in FIG. 1 will first be given. This machine comprises a base 1 having an upright 2 which constitutes a barrel support in which a barrel 3 is rotatingly supported. Barrel 3 rotates about a horizontal axis and bears a series of spindles 4 having parallel axes distributed about the central axis of barrel 3 and each comprising a chuck 5 intended to grip a bar (not shown) held in a spindle 4. The general operation of this machine need not be described in detail here. It is known that the chucks open periodically and that suitable means cause the bars to advance by a predetermined length, after which tools, e.g., a radial tool mounted in a tool holder 6, and/or front-mounted tools such as a drill 7 or a tapper 8, carry out machining operations on the front ends of the bars. These bars are made integral by means of chucks 5 with spindles 4 which rotate about their axes, each in one of the machining stations provided. Components 9 and 10 are scrolls which, when barrel 3 is indexed, are driven via a shaft 11 by an indexing motor 12, so that barrel 3 and the group of bars held in spindles 4 rotate together in order for each bar to reach the following machining station.

The machine therefore comprises, on base 1, a frame 13 in the top part of which work stations 14 are mounted, distributed so that each one faces one of the machining stations defined by the stopping positions of barrel 3. Base 1 bears a main motor 15 which, via belts 16, drives a shaft 17, the rotation of which is communicated by suitable gearing to spindles 4. On the other hand, via a system of rotary driving means 18 comprising various pinions, transmissions, and couplings, which need not be described here, various motors, e.g., a motor 19 and an adjustable-speed motor 20, rotate work spindles (not shown) which are mounted in work stations 14 and drive rotary tools such as 7 and 8.

The driving apparatus which will now be described uses one of the work stations 14. It comprises, on the one hand, an autonomous unit 21 and, on the other hand, control means 22. These two parts of the apparatus are shown diagrammatically in FIG. 2 and in more detail in FIGS. 3 and 4. Unit 21 is mounted on a support 23 intended to be fixed against frame 13 at the location of one of the work stations 14. Mounted within support 23 is a sliding sleeve 24. As may be seen in FIG. 2, unit 21 comprises a cylinder 25; and sliding sleeve 24 comprises, approximately halfway along its length, a collar 26 which will be provided with a gasket and functions as a piston. The two ends of cylinder 25 are fed by ducts 27 and 28 so that axial movements toward the left or the right, as viewed in FIG. 2, can be controlled and cause displacement of sleeve 24. Disposed within sleeve 24 is a rotary assembly 29 supported within sleeve 24 by bearings and comprising in particular a grooved hollow shaft 30, the rearward end of which is seen in FIG. 2. This grooved end of hollow shaft 30 is coupled by means of one or more keys 31 to a hub 32, the central part of which surrounds the rearward end of sleeve 24 and is supported by bearings 33 and 34 in frame 13. Mounted on hub 32 is a multiple pinion 35 which can be displaced axially, in a manner known per se, and co-operate with a gear element 36 to drive rotary assembly 29 at variable speeds while allowing hollow shaft 30 and the elements integral therewith to move axially in response to the movement of piston 26 controlled by the hydraulic device.

FIG. 3 again shows part of support 23, cylinder 25, and the front end of sleeve 24. It also shows the front end of hollow shaft 30 supported within sleeve 24 by a bearing 37. Sleeve 24 bears at its front end a chuck, designated as a whole by reference numeral 38 and shown in more detail in FIGS. 3 and 4. Chuck 38 comprises a generally cylindrical chuck body 39 having a rear extension 41 connected by a locking means 40 to the end of sleeve 24. Rear extension 41 bears a rear bearing 42 coaxial with a front bearing 43 of larger diameter. These two bearings support the rotary part of the chuck, which in turn comprises a spindle 44 ending at the rear in a rocket shape 45 with grooves allowing spindle 44 to be connected to hollow shaft 30 by means of a coupling sleeve 46. Spindle 44 guides in a recess in its front end an axially movable collet 47 and a chuck element 48 of conventional design. Collet 47 co-operates with three radially disposed levers 49 and with an axially movable piston 50 in response to air pressure injected through an inlet connection 51. By moving axially forward, piston 50 urges levers 49 which press against a shoulder of spindle 44 and cause collet 47 to back up toward the rear against the bias of a chucking spring 52. Hence chuck element 48, which is held in place by a secondary spring 53, is released and can open, whereas it is kept closed when collet 47 is urged forward by spring 52 in the absence of air pressure in the chamber contrived between piston 50 and the back of the cylinder formed within chuck body 41.

The air pressure reaches connection 51 through a tube 54, monitored by a solenoid valve 55 (FIG. 2) which operates in co-operation with a solenoid valve 58 directly or inversely feeding tubes 27 and 28 which admit oil pressure to cylinder 25. Thus control device 22, acting upon solenoid valves 55 and 58, makes it possible to control monitored axial movements of sleeve 24, as well as the opening and closing of chuck 38. Control device 22 will likewise be connected to whichever of motors 19 and 20 is used to rotate shaft 30 via pinion 35. This electronic unit will likewise be connected to detectors, one of which, for example, designated by reference numeral 61, is shown in FIG. 1. This is a detector intended for taking the angular reference of the spindle 4 situated opposite the work station equipped with autonomous unit 21. Detector 61 is, for example, a proximity detector co-operating with a stud 56 fixed to spindle 4. It transmits a signal when this spindle is so oriented that stud 56 coincides with the detector. For instance, in the case where the bar supported by spindle 4 is a sectional bar, this detector ensures that spindle 4 is locked with the section of the bar in a predetermined orientation. Once this maneuver has been carried out, control unit 22 may, for example, control a maneuver of chuck 38 so that this chuck moves to grip the end of the bar opposite which it is situated. It will be noted that this operation can be carried out without making any change either in the design of the chuck holding the bar or in the arrangement of the corresponding spindle or in the arrangement of barrel 3. This operation having been effected, control unit 22 is in a position to control various work programs, not only on the elements of autonomous unit 21 or on the motor driving the corresponding work station, but also on other components of the processing machine.

To clarify these ideas, there will be indicated below, by way of example and in summary, a program of a number of stages which in turn comprises different variations as regards some of these stages.

DESCRIPTION OF THE CYCLE 1. (Preliminary operation) Indexing of the barrel. During this movement, spindle 4 is braked and passes from speed N to speed zero. Locking of the barrel. Locking of the spindle once stopped. This operation can be carried out by disposing (see FIG. 6) within barrel 3, coaxially with spindle 4, a locking cone 62 co-operating with a sliding clutch part 63 which slides on the spindle and can be moved, starting from an intermediate position (0), either (1) into a clutching position with a pinion 64 rotated by shaft 17, or (2), into a locking position in contact with locking cone 62. The sliding part 63 will be keyed on the shaft of spindle 4.

2. Control of spindle 38. Gripping of chuck 39 on the end of the bar or on the workpiece.

3. Release of sliding part 63 from its locking position.

4. Control of indexing of the bar or of the workpiece and stopping of rotation by means of drive motor 20 or 19 upon the signal supplied by detector 61.

5. Control of a machining operation (drilling, radial milling, slicing, etc.).

6. Rotation of spindle 38 through a predetermined angle with a view to a second radial machining operation or placing of an auxiliary machining part, then carrying out an operation by means of that part, with spindle 38 remaining fixed, or C-axis machining operation, making it possible to machine, for example through milling, a helical groove, the control unit then simultaneously controlling a rotational movement of spindle 38 and an axial movement of the machining tool, the bar or the workpiece still being gripped in chuck 39.

7. Return of spindle 38 to its starting position.

8. Unclamping of chuck 39 and retraction of spindle 38.

9. Indexing of barrel 3. During this movement, the spindle will again be driven so as to pass from speed zero to speed N. The new spindle which comes into place in the machining station where unit 21 is situated undergoes the operation described in 1 above, so that the cycle is complete.

Thus, as may be seen on the basis of this example, control unit 22 may comprise the inputs and outputs necessary for controlling all these different operations.

FIG. 5 further illustrates diagrammatically the arrangement corresponding to the carrying out of a machining operation forming a helical groove on the lateral surface of a cylindrical workpiece 57. This drawing shows body 39 of the chuck and spindle 38, as well as support 23 fixed to frame 13. Mounted at the top of upright 2, used for pivoting barrel 3, is a tool support 58 bearing a milling tool 59 supported by a slide so as to move radially relative to the axis of spindle 38. Chuck 5 of the corresponding spindle of barrel 3 is likewise shown in FIG. 5. It is seen that a slicing operation has been carried out on the end of the bar gripped in chuck 5, so that workpiece 57 has been moved away from chuck 5 by an axial displacement of spindle 38. The radial movement of milling cutter 60 is a movement whose control meets criterion X, whereas the rotation of spindle 38 is a movement meeting the criterion called C-axis. The axial displacement of spindle 38 meets the criterion called Z2. Thus, the production of a helical groove in the cylindrical side surface of workpiece 57 is an operation necessitating a control XCZ2. Such a control is easily programmable when the processing machine is equipped with a numeric control. This naturally means that the auxiliary motor used to drive shaft 30 must be C-axis guidable by the numeric control device of the machine.

As concerns FIG. 5, it may also be indicated that in another variation, if workpiece 57 were not separated from the bar, the program for carrying out the operations might comprise an opening of chuck 5 in order to permit an axial displacement of the whole bar at the time of the machining operation by means of milling cutter 60, then the return of the bar to its normal position and reclamping of chuck 5. Next, chuck 39 would be opened, and spindle 38 would retract in order to permit indexing of the barrel and repetition of the operation on the following bar. If workpiece 57 had been sliced or were a separate piece, it would obviously be ejected into a receptacle at the end of the operation, i.e., upon opening of chuck 39.

Another variation would be that the movement Z2 would not be carried out by machining unit 21 but rather by an axial movement of milling tool 59.

What is claimed is:

1. Machining equipment comprising:
   a base;
   a barrel support mounted on the base;
   a barrel mounted on the barrel support for rotation about an axis;
   a plurality of bar-receiving spindles rotatably mounted on the barrel in spaced relationship about said axis, each spindle including means for holding a bar;
   means for rotating the spindles;
   coupling means for selectively coupling at least one of said spindles to said means for rotating the spindles, said coupling means having a forced driven position wherein said means for rotating the spindles is coupled to said at least one spindle, a locking position wherein said at least one spindle is locked to prevent rotation thereof, and a free rotating position wherein said at least one spindle can rotate freely;
   a machine station frame mounted on the base in facing relationship to the barrel support;
   a plurality of machining stations on the machine station frame for performing work on bars held by spindles having coupling means in the forced driven position;
   indexing means for situating each spindle at the machining staions;
   a bar holding unit on the work station frame, said bar holding unit being movable in rotation and in translation with respect to said frame;
   means for effecting relative translational movement between the bar holding unit and a spindle coaxially indexed therewith so that the bar holding unit is positioned adjacent the coaxially indexed spindle to effect movement of a bar located in the coaxially indexed spindle by the bar holding unit;
   a chuck on the bar holding unit for receiving a bar;
   operating means for operating said chuck between open and closed states, said operating means cooperating with said means for effecting relative translation movement to perform one of gripping and releasing of a bar in said coaxially indexed spindle;
   rotary driving means for rotating the bar holding unit; and
   control means for controlling indexing of the barrel by said indexing means, rotation of the spindles by said means for rotating the spindles, operation of the machining stations, said relative translational movement between said coaxially indexed spindle and the bar holding unit by said means for effecting relative translational movement, rotation of the bar holding unit by said rotary driving means, and said coupling means, whereby a controlled rotation of said coaxially indexed spindle by said bar holding unit is achieved by placing the coupling means of said coaxially indexed spindle in said free rotating position.

2. The apparatus of claim 1, wherein said bar holding unit comprises a shaft element bearing said chuck, said control means comprises a fluid control means for opening and closing said chuck and axially moving said shaft element, and wherein said control means controls repetitive opening, closing, and axial movement of said chuck.

3. The appartus of claim 2, wherein said control means provides an output to said rotary driving means for controlling and monitoring rotation thereof when said rotary driving means rotates said bar holding unit.

4. The apparatus of claim 3, further comprising detector means mounted on said barrel for detecting at least one predetermined orientation of one of said spindles situated in one of said machining stations, said control means including input means for receiving a signal from said detector.

5. The apparatus of claim 4, and further comprising means for machining a bar held in the bar holding unit.

6. The apparatus of claim 5, wherein the means for machining a bar is mounted on the barrel support.

7. The apparatus of claim 5, wherein the control means effects rotation and translation of the bar holding unit while said means for machining machines the bar in the bar holding unit.

8. The apparatus of claim 1, wherein the control means is programmable.

9. The apparatus of claim 1, wherein said bar holding unit includes mounting means for mounting the bar holding unit at one of the machining stations.

* * * * *